(No Model.) 2 Sheets—Sheet 1.
P. J. PAULY, Sr. & J. J. LIGON.
ROTARY JAIL.
No. 390,093. Patented Sept. 25, 1888.
Fig. I.
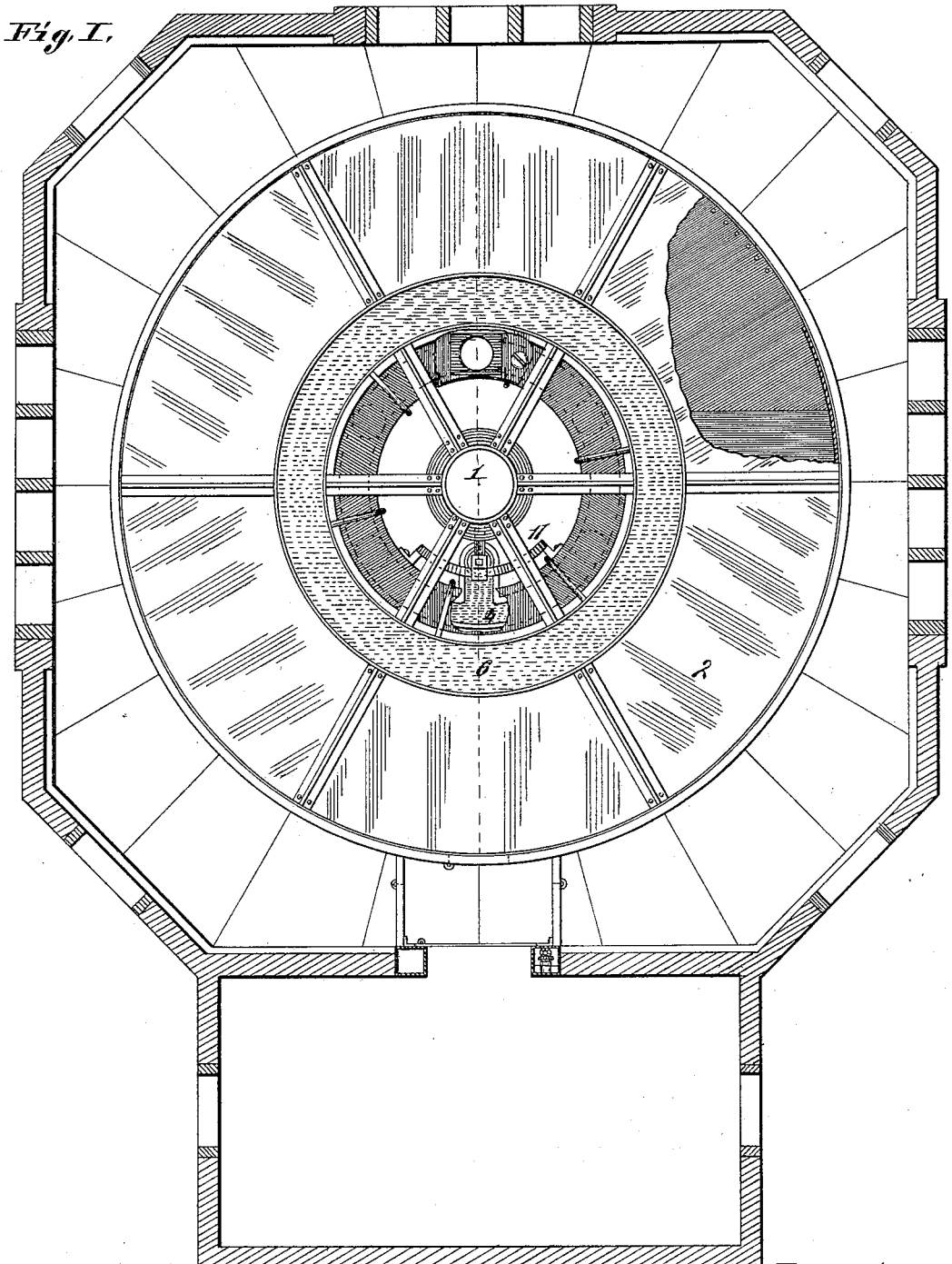
Attest:
L. H. Hopkins
E. Arthur
Inventor:
Peter J. Pauly, Sr.
Jas J. Ligon
By Knight Bro
att'ys (No Model.) 2 Sheets—Sheet 2.
P. J. PAULY, Sr. & J. J. LIGON.
ROTARY JAIL.
No. 390,093. Patented Sept. 25, 1888.
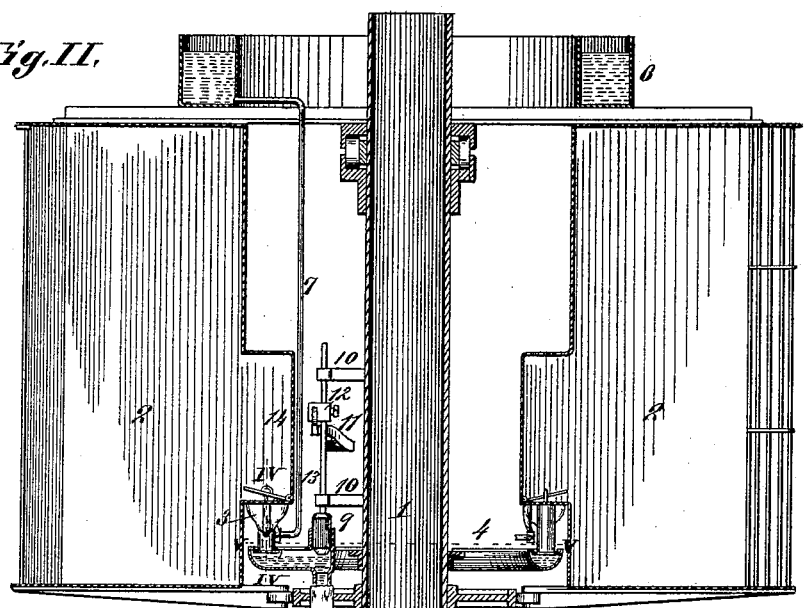
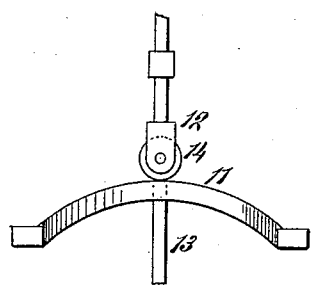
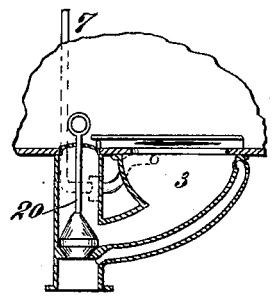
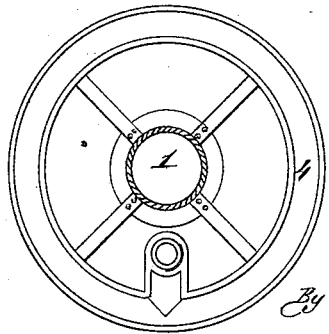
Attest:
R. J. Hopkins
C. Arthur
Inventor;
Peter J. Pauly, Sr.
Jas. J. Ligon.
By Knight Bros
att'ys

United States Patent Office.

PETER J. PAULY, SR., AND JAMES J. LIGON, OF ST. LOUIS, MISSOURI.

ROTARY JAIL.

SPECIFICATION forming part of Letters Patent No. 390,093, dated September 25, 1888.

Application filed May 3, 1887. Serial No. 237,000. (No model.)

*To all whom it may concern:*

Be it known that we, PETER J. PAULY, Sr., and JAMES J. LIGON, both of the city of St. Louis, in the State of Missouri, have invented a certain new and useful Improvement in Rotary Jails, of which the following is a full, clear, and exact description, reference being had to the accompanying drawings forming part of this specification, and in which—

Figure I is a top view of a rotary jail illustrating our improvement. Fig. II is a vertical section. Fig. III is an enlarged detail view illustrating the mechanism for operating the valve. Fig. IV is an enlarged detail section of the bowl and valve, taken on line IV IV, Fig. II. Fig. V is a transverse section taken on line V V, Fig. II.

Our invention relates to certain improvements in rotary jails of the class shown and described in the patent of Brown & Haugh, issued July 12, 1881, No. 244,358; and our invention consists in features of novelty hereinafter fully described, and pointed out in the claims.

Referring to the drawings, 1 represents the central pipe or shaft; 2, the rotary cells supported on said pipe; 3, the bowls; 4, the annular trough with which the bowls communicate, and 5 the soil-pipe, all of these parts being substantially the same as the corresponding part of the said patent.

6 represents a water-tank supported on the cells and connected by pipes 7 with the respective bowls. They are provided at the bowls with ordinary valves, 20, to control the flow of water. The idea of locating a water-tank on top of the cells and pipes forming a communication between this tank and the respective bowls constitutes one part of our invention.

9 represents a valve supported by brackets or arms 10 on the pipe, which serves to regulate the flow from the annular trough 6 to the soil-pipe. The manner of operating this valve forms the other feature of our invention. It is operated through means of a cam, 11, secured to the cells, and which engages with an adjustable block, 12, on the stem 13 of the valve, the block being preferably provided with a friction-roller, 14. It will thus be seen that as the cells are revolved the valve 9 will be opened. This would take place each time the cells make a revolution during the ordinary removal or admission of the prisoners; or, should it be necessary, the cells could be revolved on purpose to operate the valve.

While we have shown the cam 11 for operating the valve, we do not wish to confine ourselves to any particular form of device for doing this, as any device on the rotary cells that would come in contact with the valve to open it would accomplish the purpose.

We claim as our invention—

1. In a rotary jail, in combination with the cells provided with bowls, the water tank located above the cells, and pipes connecting the tank with the bowls, substantially as set forth.

2. In a rotary jail, in combination with the cells provided with bowls, an annular water-tank supported on and carried by the cells, and pipes connecting the tank to the respective bowls, substantially as set forth.

3. In a rotary jail, in combination with the trough and bowls communicating therewith, a valve located in said trough, and a cam secured to the cells and engaging the said valve, substantially as set forth.

4. In a rotary jail, in combination with the trough and bowls communicating therewith, a valve located in said trough, stem 13 on the valve, block 12 on the stem, and cam 11 on the cells, substantially as and for the purpose set forth.

5. In a rotary jail, in combination with the cells, trough, and bowls communicating with the trough, a valve for controlling the flow from the trough and operated by turning the cells, substantially as set forth.

PETER J. PAULY, SR.
JAMES J. LIGON.

In presence of—
GEO. H. KNIGHT,
EDW. S. KNIGHT.